United States Patent [19]
Ward et al.

[11] Patent Number: 4,709,938
[45] Date of Patent: Dec. 1, 1987

[54] SPLASH GUARD

[75] Inventors: Douglas K. Ward; Jerry N. Moscovitch, both of Toronto, Canada

[73] Assignee: Powerflow, Inc., Buffalo, N.Y.

[21] Appl. No.: 799,332

[22] Filed: Nov. 18, 1985

[51] Int. Cl.$^4$ .............................................. B62B 9/14
[52] U.S. Cl. ............................................ 280/154.5 R
[58] Field of Search ................... 280/154.5 R, 153 R, 280/154.5 A, 154, 152 R

[56] References Cited

U.S. PATENT DOCUMENTS

| | | | |
|---|---|---|---|
| 1,864,456 | 6/1932 | McCollum | 280/154.5 R |
| 1,993,067 | 3/1935 | Littlefield | 280/154.5 R |
| 2,124,041 | 7/1938 | Schatzman | 280/153 R |
| 2,196,030 | 4/1940 | Schatzman | 280/153 R |
| 3,027,178 | 3/1962 | Eaves | 280/154.5 R |
| 3,953,053 | 4/1976 | Arenhold | 280/154.5 R |
| 4,012,053 | 3/1977 | Bode | 280/154.5 R |
| 4,099,736 | 7/1978 | Shiina | 280/154.5 R |
| 4,169,608 | 10/1979 | Logan | 280/153 R |
| 4,174,850 | 11/1979 | Hart | 280/152 R |
| 4,215,873 | 8/1980 | Price | 280/153 R |
| 4,264,083 | 4/1981 | Matthew | 280/154.5 R |
| 4,293,140 | 10/1981 | Bell et al. | 280/154.5 R |
| 4,315,634 | 2/1982 | Arenhold | 280/154.5 R |
| 4,408,939 | 10/1983 | Graff et al. | 411/112 |
| 4,447,067 | 5/1984 | Yamashita | 280/153 R |
| 4,621,824 | 11/1986 | Arenhold | 280/154.5 R |
| 4,629,204 | 12/1986 | Arenhold | 280/154.5 R |

FOREIGN PATENT DOCUMENTS

| | | |
|---|---|---|
| 2529718 | 1/1977 | Fed. Rep. of Germany . |
| 3136592 | 2/1983 | Fed. Rep. of Germany ... 280/154.5 R |
| 2410591 | 5/1978 | France . |
| 7707829 | 7/1977 | Netherlands . |

OTHER PUBLICATIONS

Catalog, D. H. Buck Co., Inc., entitled: Urethane, Flares, Spoilers & Splash Guards; 10 pages, copyrighted 1982.
Kamei Automotive Accessory Catalog; copyright 1983; p. 14.

Primary Examiner—John J. Love
Assistant Examiner—Michael Mar
Attorney, Agent, or Firm—Watts, Hoffmann, Fisher & Heinke Co.

[57] ABSTRACT

A splash guard for use on auto vehicles having at each wheel a body panel and a flange which in part defines a wheel well. The splash guard includes a body portion with an upper section and an adjacent mounting part formed to engage and cover the wheel well flange during use. The mounting part being curved in an upright plane of cross section whereby in use it is either undistorted or distorted into a condition of lesser curvature. The body portion also includes a lower section which is dished for enhanced splash protection, and sufficiently curved to disguise splash guard deformation and a lack of parallelism with a road surface. A flange portion projects from the body portion in a rearward direction during use and is preferably of a material capable of deforming to effect a seal between the flange portion and body panel. The flange portion includes a surface which engages the body panel and which is at an acute angle with the surface which engages the wheel well flange.

18 Claims, 15 Drawing Figures

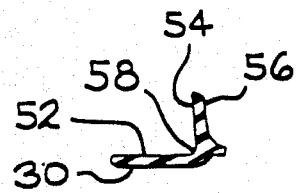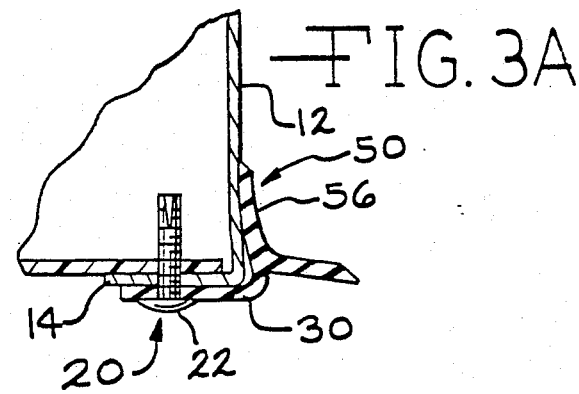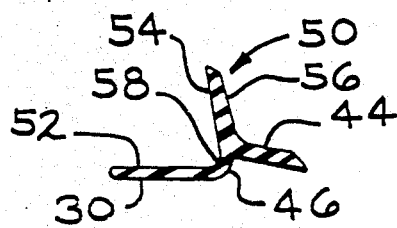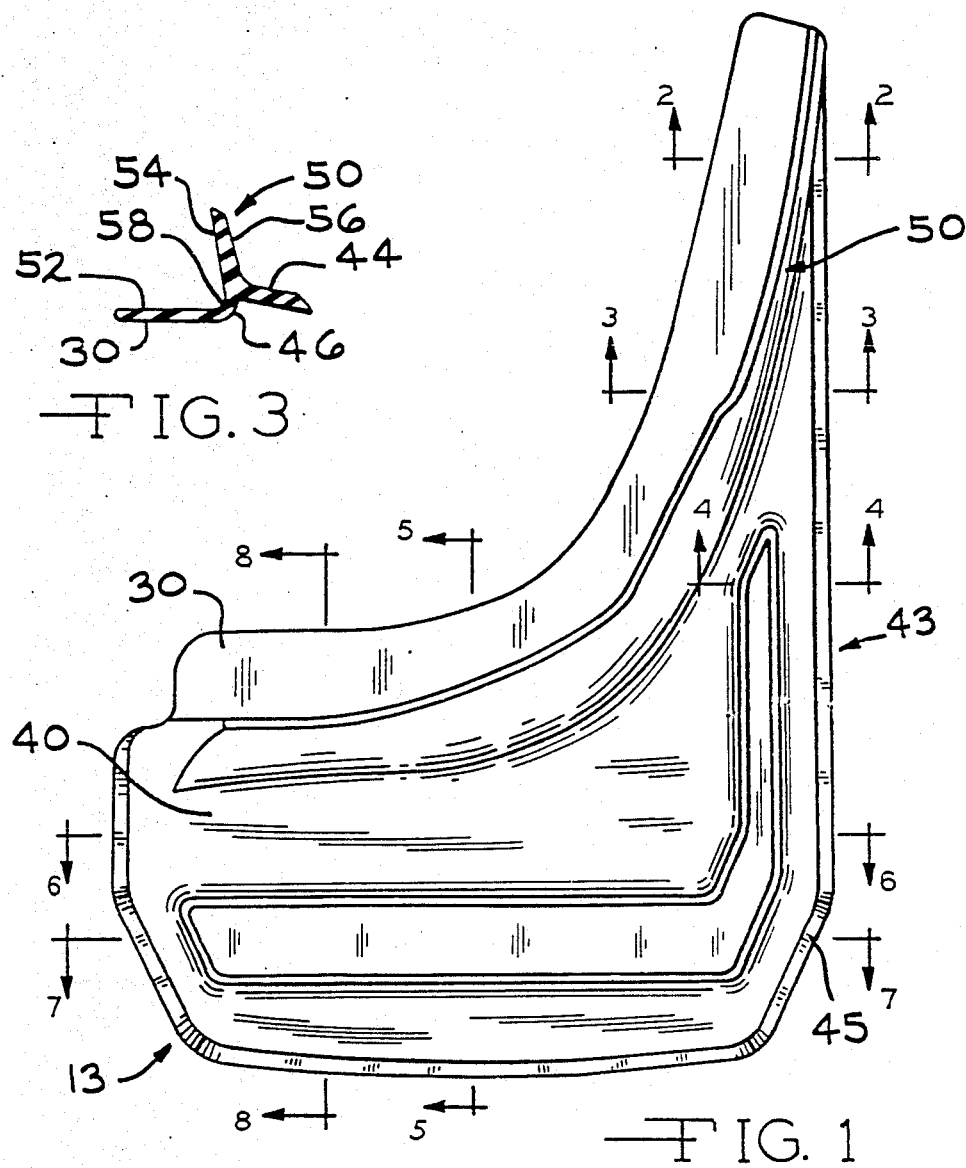

SPLASH GUARD

TECHNICAL FIELD

The present invention is directed toward improved splash guards for automotive vehicles each of which is adapted to be attached to a variety of vehicle models while giving the appearance of a customized splash guard.

BACKGROUND ART

Several types of splash guards are known for containing or controlling the splashing of water and dirt which is generated as tires travel on a roadway.

Splash guards have not normally been provided as original vehicle equipment, and it is believed that automotive manufacturers, at least in the United States, are currently reluctant to install splash guards due to current Federal regulations.

Although splash guards having a variety of shapes are known, one of the most common types includes a flat sheet-form body mounted to the vehicle flange by means of threaded fasteners or the like. It is believed the flat body splash guard have become popular due to its simple style which has provided inexpensive manufacturing for automotive after market suppliers and the facility with which it can be fitted to a wide variety of vehicles.

While the flat splash guards have been sold on a "one size fits many" basis, the few sizes and shapes of splash guard have not always provided a satisfactory fit for every vehicle. If splash guards do not fit properly they may not be cosmetically acceptable to the vehicle owner and in many cases they will not provide good splash control.

Since splash guards are not normally standard equipment on newly purchase automobiles, they are usually installed by or for the owner subsequent to purchase. The splash guards are generally mounted behind the front and rear wheels and are attached to structure forming part of the wheel opening in the fender. In most automobiles, the wheel opening is defined by a flanged lip that is bent in a direction toward the centerline of the automobile. Splash guards are typically installed by fastening the splash guard to a portion of this flange.

Various methods for attaching splash guards to a fender flange have been proposed. One of the most common methods is the use of threaded fasteners which extend through a splash guard and threadedly engage apertures in the flange. This method is less than satisfactory because it requires a drilling operation be performed on the fender flange prior to installation. Drilling holes in the sheet metal of the vehicle body is also unsatisfactory because it typically cannot be done unless the vehicle has been jacked up and a wheel removed.

Other methods for attaching flat splash guards to the flange which obviate the need for removing wheels and drilling apertures in the flange have also been suggested. One of these proposed devices is shown in U.S. Pat. No. 4,264,083. The device discloses a U-shaped spring clip engageable with a fender flange, that carries an outwardly extending pin. A retaining cap installed onto the pin maintains the splash guard on the clip. Another device is illustrated in U.S. Pat. No. 4,293,140. The device provides a Z-shaped metal spring clip defining two interconnected U-shaped portions. One U-shaped portion frictionally engages the fender flange, while the other portion engages a splash guard.

While both of these devices do provide simple splash guard attachment, it is believed that in use, the flat splash guards are relatively unstable and are easily dislodged when lateral forces are applied to the guards. When these types of devices are used for mounting sheet-form splash guards, the stability of the mount is dependent on the resiliencey of the clip. It is also believed that external forces applied to the splash guard, such as by a car wash, tend to dislodge the splash guard.

Another proposed device is disclosed in U.S. Pat. No. 4,525,985. The device shows a clamp engageable with a fender flange that carries a threaded member which extends through the splash guard. The device disclosed provides a clamping structure which does not depend on the resiliency of the clip to maintain the splash guard. While this structure does provide a superior stabile mount, strong lateral forces may on occasion be able to disengage the splash guard from the fender.

DISCLOSURE OF THE INVENTION

The present invention provides a new and improved splash guard construction which eliminates the described and other disadvantages of conventional splash guards. According to the invention, the device includes structure defining a body portion having a curved contour for enhanced splash deflecting protection. In a preferred embodiment, the body portion provides an upper section having a mounting part which includes a surface for engaging a section of wheel well flange, and a flange portion projecting from the body portion in a rearward direction during use.

According to a preferred and illustrated embodiment, the mounting part has an upright cross section which is curved as greatly as the wheel well flange of any vehicle to which the mounting part is to be attached. With the preferred construction the curvature of the mounting part is either undistorted or distorted into a condition of lesser curvature when in use.

In the preferred embodiment, a flange portion is provided which includes an inner surface for engaging the body panel and an outer surface having a curved contour for disguising flange portion deformation experienced during mounting. With the preferred construction the inner engagement surface of the flange portion forms an acute angle with the flange engaging surface of the mounting part. In the preferred embodiment the acute angle will continue to be acute both before and during mounting part deformation engagement with the vehicle wheel well flange.

In the illustrated embodiment, the splash guard flange portion is preferably formed of a material which is sufficiently deformable and elastic to effect a seal between the flange portion and a vehicle body panel or any decorative trim secured thereto.

According to a feature of the invention, the body portion is curved in its lower section to provide additional splash deflection as well as to rigidity the section and additionally disguise distortion due to mounting. With this arrangement, the curvature of the bottom surface of the lower section also disguises any lack of parallelism between the splash guard road surface which tends to distract from the overall vehicle appearance.

It should be apparent that the present invention provides an effective yet inexpensive method for constructing a splash guard for a vehicle. Unlike the prior art, the coaction of the flange portion, which engages the vehicle body panel, and the mounting part, which engages the vehicle fender flange, provides a stabile mounting structure which is deformable to fit substantially any vehicle of intended use. The interaction between these portions enables the present invention to withstand lateral hits which would dislodge splash guards previously known. The disclosed splash guard may be constructed of a single flexible material, or having flange and body portions constructed of materials having differing degrees of flexibility.

Additional features of the invention will become apparent and a fuller understanding obtained from the following detailed description made in connection with the accompanying drawings.

BRIEF DESCRIPTION OF THE DRAWINGS

FIG. 1 is a plan view of a side of the splash guard which faces rearwardly during use;

FIG. 2 is a fragmentary sectional view taken on a horizontal plane of a splash guard along line 2—2 of FIG. 1;

FIG. 3 is a fragmentary sectional view taken on a horizontal plane of a splash guard along line 3—3 of FIG. 1;

FIG. 3a is an enlarged scale fragmentary sectinal view taken on a horizontal plane of a splash guard and threaded fastener assembled with a vehicle body having a fender liner on an interior surface of a vehicle flange along line 3—3 of FIG. 1;

BEST MODE FOR CARRYING OUT THE INVENTION

Figure 9:
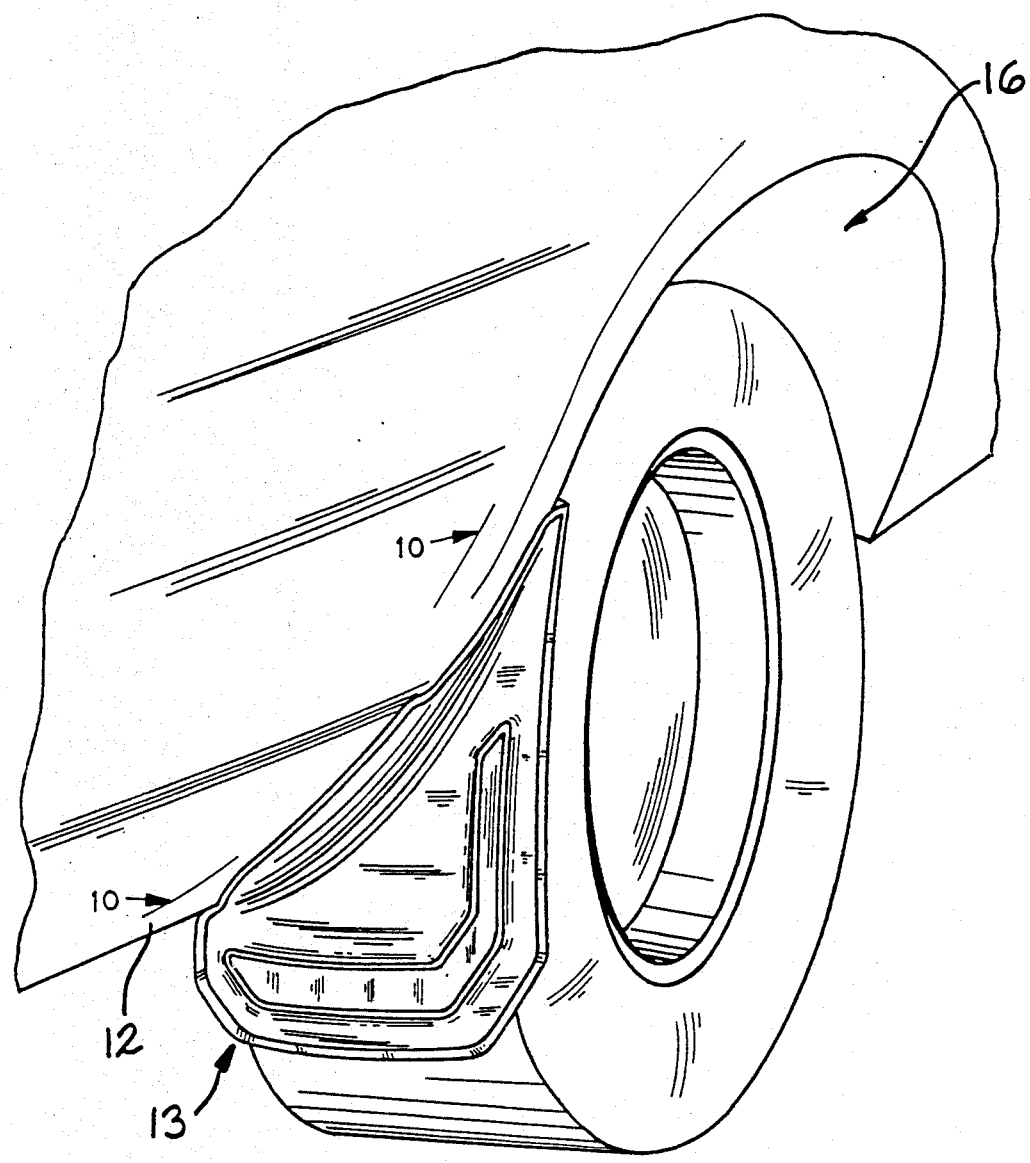
FIG. 9 is a perspective view of the splash guard embodying this invention as mounted on a vehicle.
Figure 11:
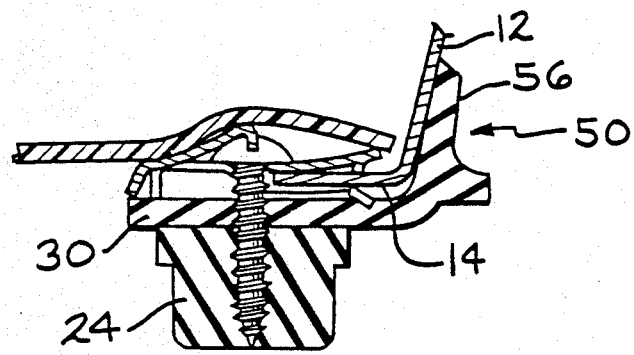
FIG. 11 is a fragmentary sectional view on an enlarged scale taken along the line 11—11 of FIG. 10.
Figure 10:
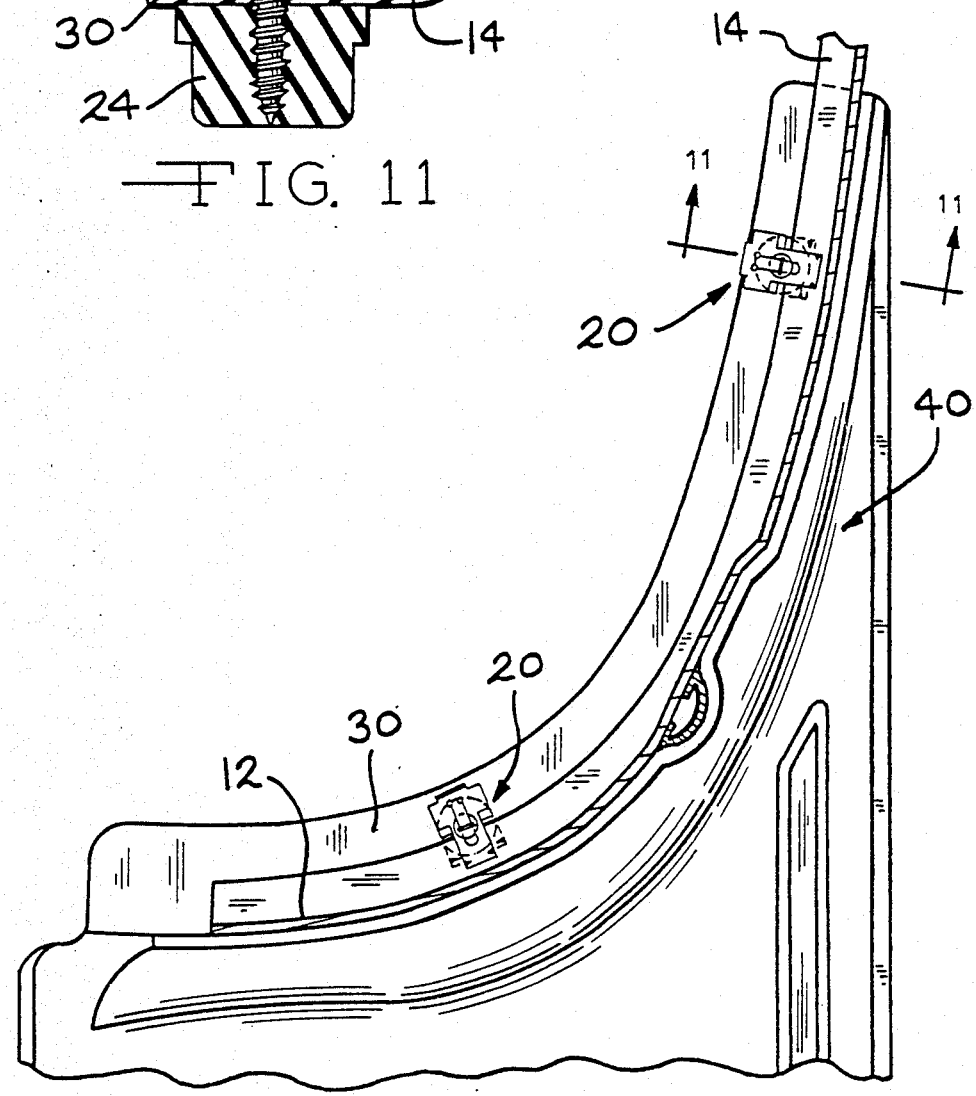
FIG. 10 is a fragmentary sectional view of the splash guard and fastener assembly mounted on a vehicle body having a decorative trim strip taken along the line 10—10 as indicated in FIG. 9.

Having reference to the drawings, the overall construction of a splash guard embodying the present invention is best illustrated in FIGS. 1, 9 and 10. The structure includes a splash guard, designated generally by the number 13, attached to a vehicle body panel 12 and including a vehicle flange 14 which defines a wheel well opening 16. A splash guard 13 may be attached to the flange 14 by a fastening means indicated generally by reference number 20.

Referring to FIGS. 3a, 5, 5a, 8 and 11, the splash guard 13 includes a body portion 40, and a flange portion 50 which projects from the body portion 40 in a direction which is rearward of the vehicle when the splash guard is in use. In the preferred embodiment, the body portion 40 is constructed to provide a contour which is curved in an upright plane of cross section during use of the splash guard. In the preferred embodiment, the curved contour should substantially correspond to the curvature of the wheel well flange of any vehicle of intended use.

The curved contours of the flange and body portions are adapted to substantially disguise splash guard distortion developed during use such that a single splash guard configuration is capable of deforming to fit multiple vehicles having different wheel well openings.

The body portion 40 preferably includes an upper section 42 which consists of an outer surface 44 and an opposed curved surface 46 which is positioned to be adjacent a mounting part 30 of the body portion. The outer surface 44 of the upper section is generally straight, while the opposed surface 46 is substantially curved to correspond to the curvature of the body panel 12 of any vehicle of intended use. The curvature of the opposed surface 46 also serves to provide the mounting part 30 of the body portion 40.

As best shown in FIGS. 5-8, the body portion 40 also includes a lower splash deflecting section, indicated generally by reference number 43. In order to provide a splash guard which enhances splash protection without distracting from the appearance of the vehicle by failing to cover the vehicle tire, the lower splash deflecting section 43 is of a greater transverse dimension than the remainder of the body portion 40 and any original equipment vehicle tire of any vehicle of intended use.

Figure 4:
FIG. 4 is a fragmentary sectional view taken on a horizontal plane of a splash guard decorative strip along line 4—4 of FIG. 1.
Figure 8:
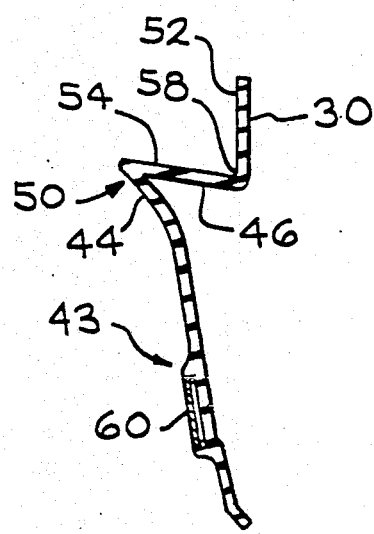
FIG. 8 is a vertical fragmentary sectional view similar to FIG. 5.
Figure 5:
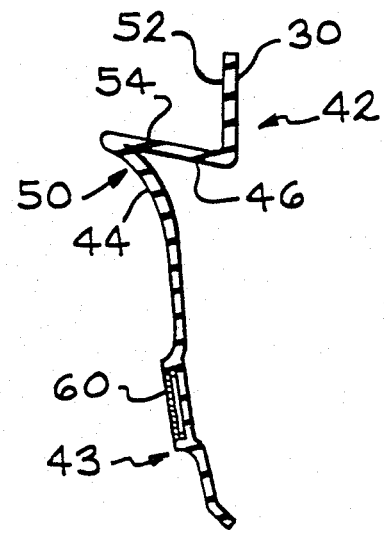
FIG. 5 is a fragmentary sectional view taken on a vertical plane of a splash guard along line 5—5 of FIG. 1.
Figure 6:
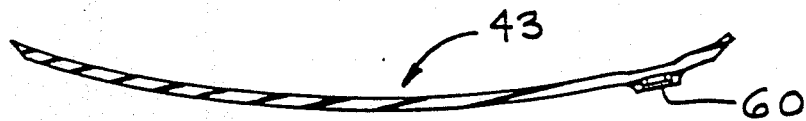
FIG. 6 is a fragmentary sectional view taken on a horizontal plane of a splash guard along line 6—6 of FIG. 1.
Figure 7:
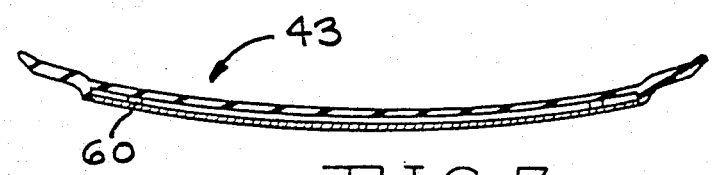
FIG. 7 is a fragmentary sectional view taken on a horizontal plane of a splash guard along line 7—7 of FIG. 1.

As shown specifically in FIGS. 6 and 7, the lower section 43 is dished to provide additional splash protection. The illustrated embodiment also provides a snap-in decorative portion 60 on the lower section 43 as shown in FIG. 4.

Referring again to FIGS. 1 and 9, the lower section is also shown to include a curved bottom surface 45 which serves to disguise any deformations in the splash guard induced by mounting, as well as any lack of parallelism between the bottom surface 45 and a road surface. In order to further rigidify the lower deflecting section against forces bending the splash guard, the curved contour of the body portion 40 extends through a substantial section of the lower splash deflecting section 43.

The flange portion 50, projecting from the body portion 40, has a structure which is curved transversely of the body portion. The flange portion is contoured to be substantially complementary to the opposed surface 46 such that the two portions define spaced extremities of a wheel well flange engagement surface 52. The flange portion 50 preferably includes a curved fillet part 58 which joins the engagement surfaces. As best seen in FIGS. 3a, 5a, 10 and 11, the flange portion 50 includes a body panel engagement surface 54 which is positioned to provide an acute angle with the wheel well engagement surface 52.

In the preferred embodiment, the angle between the engagement surfaces 52, 54 is sufficiently acute that despite deformation of the mounting part 30 during use on substantially any vehicle of intended use, the angle will continue to be acute. While substantial deformation of the engagement surfaces occurs during use, the acute nature of the angle between the surfaces 52, 54 may prevent the body panel 12 and flange 14 from ever contacting the interconnecting fillet part 58. A resulting void is created between the flange portion 14, body panel 12, and engagement surfaces 52, 54 when the surfaces 52, 54 are not completely engaged with their respective parts 52, 54. Car wash brushes are well suited for cleaning between the body panel 12 and body panel engagement surface 54, in order to prevent the build up of material which may be deposited in the void.

During use of the splash guard 13 the panel engagement surface 54 is in deforming engagement with the vehicle body panel 12, to effect a substantially tight seal between the flange portion 50, the body panel 12, and any decorative trim which may be secured to vehicles having contemporary body styling, as shown in FIG. 10. To effect such a seal, the flange portion 50 must be sufficiently elastic and deformable. A construction such as this may be obtained by manufacturing the flange portion 50 and body portion 40 of a single flexible material, or of materials having differing elastic or deformation characteristics.

In order to disguise deformation of the flange portion 50 which occurs during use, an outer surface 56 of the flange portion 50 is contoured to provide a curved configuration. Additionally, the outer surface 56 and engagement surface 54 are constructed to generally taper toward one another in a direction away from the body portion 40. The general tapering effect reduce the flange wall thickness and enables the flange portion 50 to function as an exponential spring by providing a non-linear increase in internal resistance to deformation in the flange portion 50.

The body portion 40 additionally provides a mounting part 30 having a wheel well flange engagement surface 52 which is adapted to substantially cover the wheel well flange 14 of any vehicle of intended use. The mounting part 30 is offset forwardly of the remainder of the body portion 40 during use of the splash guard 13, and is curved substantially as greatly as the vehicle wheel well flange 14, such that mounting part curvature is either undistorted or distorted into a condition of lesser curvature.

The splash guard is secured to the vehicle flange 14 by a fastening means 20 which may comprise a threaded fastener 22 or a flange fastener 24, and which is adapted to be secured to the vehicle wheel well flange 14 and the mounting part 30 during use. The splash guard assembly of the present invention is further adapted to prevent lateral splash guard movement relative to the vehicle body panel 12.

In order to facilitate installation of the splash guards a variety of mounting part constructions may be selected to match the structure of the wheel well opening 16 of the vehicle of intended use. In accordance with the invention, several types of mounting parts are disclosed in order to supply splash guards which fit the variety of different wheel well flange and wheel well liner configurations used by automotive manufacturers.

Figure 13:
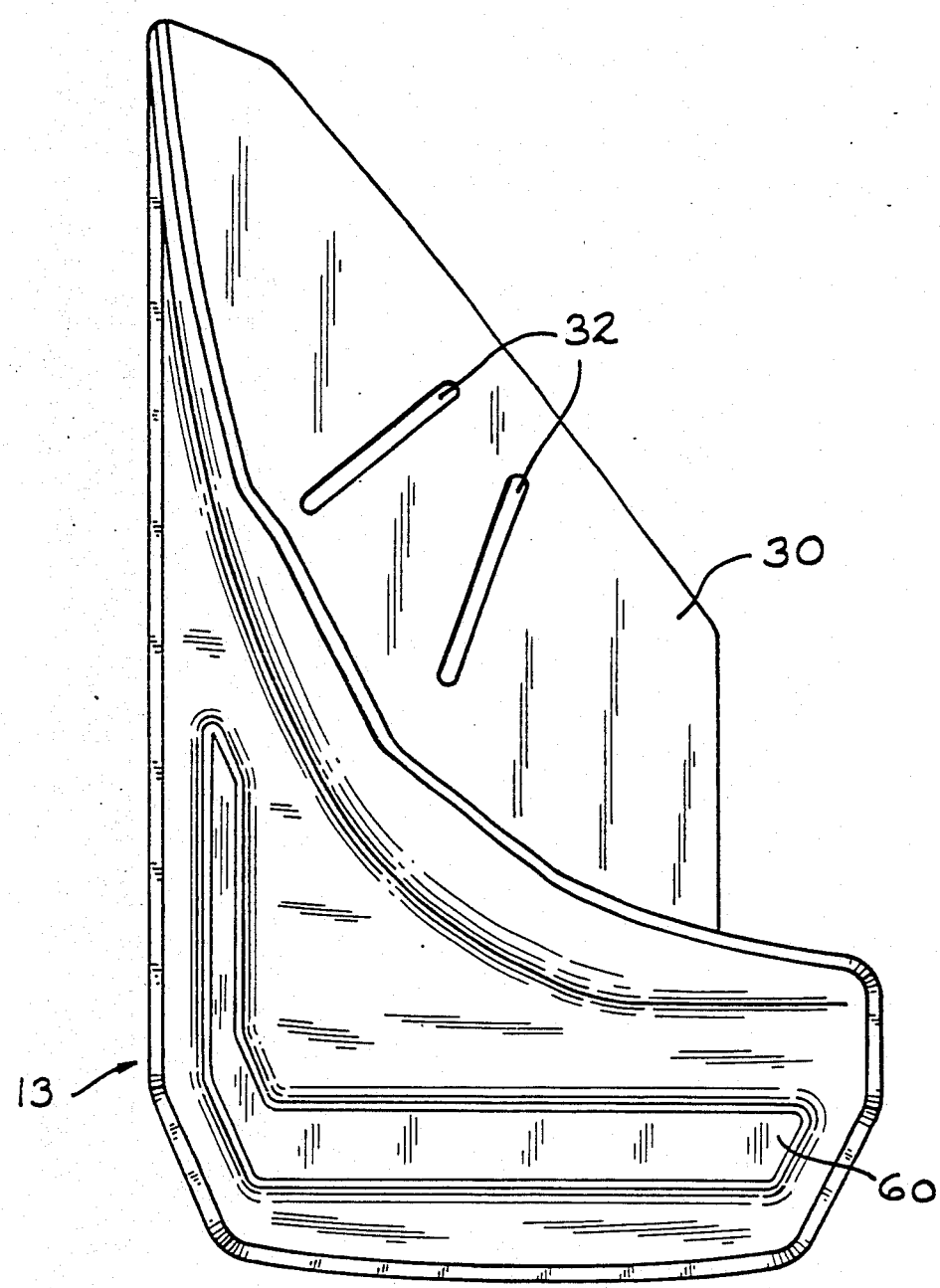
FIG. 13 is a plan view of the splash guard similar to FIG. 12, and also showing a further modified mounting.

The mounting part 30 of FIG. 13 has a substantially rectangular shape which extends from the body portion. Mounting part apertures 32 are provided to be alignable with pre-existing wheel well liner apertures provided by the manufacturer. Threaded fasteners 22 may then be extended through the mounting part and liner apertures in order to secure the splash guard to the vehicle.

Figures 5A, 12:
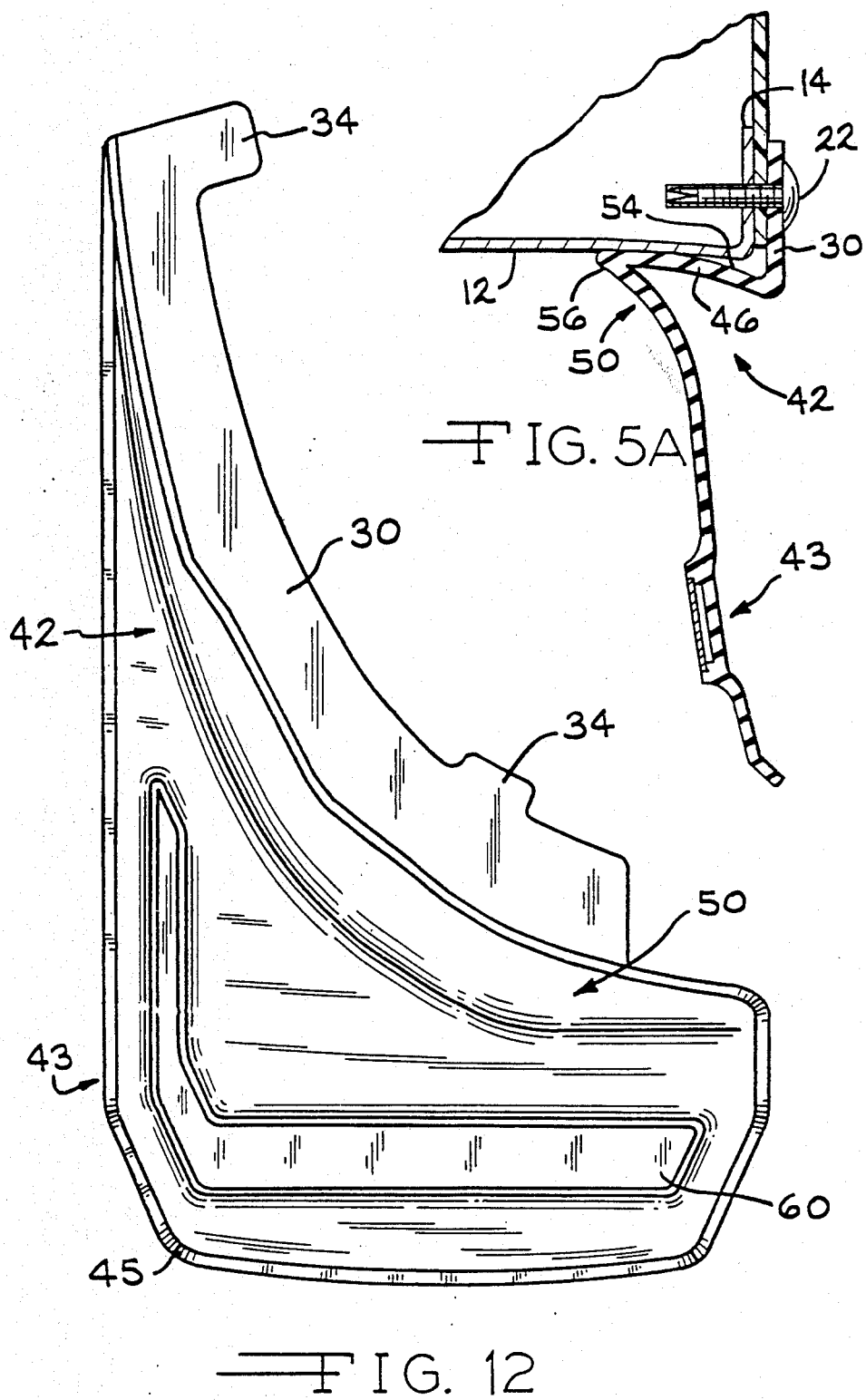
FIG. 5a is a vertical fragmentary sectional view of a splash guard and threaded fastener assembled with a vehicle body having a fender liner on an exterior surface of a vehicle fender flange taken on an enlarged scale along line 5—5 of FIG. 1.
FIG. 12 is a plan view of the splash guard similar to FIG. 1, but showing a modified mouting.

As shown in FIG. 12, mounting tabs 34 which project from an edge surface of the mounting part 30 may also be provided. The combination of fastening means 20 and mounting parts 30 suggested enable the present splash guard assembly to be used on vehicles having accessible vehicle flanges, as well as vehicles equipped with wheel well liners which may make the flange inaccessible to conventional fastening means.

Although the invention has been described with a certain degree of particularity, it should be understood that various changes can be made to it by those skilled in the art without departing from the spirit or scope of the invention as hereinafter claimed.

We claim:

1. A splash guard for use on auto vehicle having a body panel including a flange defining a wheel well opening curved in a plane of cross section longitudinal of the vehicle and a body surface curved in a plane of cross section transverse to the vehicle, the splash guard being formed of a material which is sufficiently elastic to permit deformation during installation but sufficiently inelastic to substantially retain its shape once installed on a vehicle, the splash guard comprising:

(a) a body portion having, in an upright plane of cross section when the splash guard is in use, a curved contour;
   (b) the body portion including an upper section having an outer surface and an opposed curved surface adjacent a mounting part of the body portion, the mounting part having a wheel well flange engagement surface adapted to engage and cover a section of such wheel well flange when in use;
   (c) the mounting part having a curvature in an upright plane of cross section substantially equal to or greater than the curvature of a wheel well flange of substantially any vehicle of intended use whereby when in use such mounting part either remains undistorted or is distorted into a condition of lesser curvature;
   (d) the body portion also including a lower splash deflecting section of a transverse dimension greater than the remainder of the body portion and greater than the transverse dimension of any original equipment tire on any such vehicle of intended use;
   (e) the splash deflecting section being dished to provide enhanced vehicle splash protection when in use;
   (f) the splash guard also including a flange portion projecting from the body portion in a direction that is rearwardly when in use, the flange portion being curved transversely of the body portion in a contour substantially complemental to the adjacent opposed surface such that the flange portion and the opposed surface define spaced extremities of the wheel well flange engagement surface;
   (g) the flange portion including a body panel engagement surface at an acute angle with the flange engagement surface in a plane of cross section longitudinal of the vehicle when the splash guard is in use;
   (h) the flange portion also having an outer surface contoured to a configuration which disguises any deformation of the flange portion which may occur when the splash guard is in use and the panel engagement surface of the flange portion is in deforming engagement with a body panel of the vehicle; and, (i) the flange portion being sufficiently deformable and having sufficient elasticity to effect a seal between the flange portion and the body panel and any decorative trim or the lie secured to the panel.

2. The splash guard of claim 1 wherein the mounting part is offset forwardly of the remainder of the body portion when the splash guard is in use.

3. The splash guard of claim 1 wherein the angle between the engagement surfaces is so acuate that it will continue to be acute when the mounting part is deformed into wheel well flange engagement on substantially any vehicle of intended use.

4. The splash guard of claim 1 wherein the lower section has a bottom surface curved sufficiently to disguise mounting induced splash guard deformations and a lack of parallelism with a road surface when in use.

5. The splash guard of claim 1 further including as a portion of a splash guard assembly flange fasteners adapted to be maintained in locking engagement with the mounting part by means comprising a threaded fastener and a locking cap threadedly engageable with said fastener.

6. The splash guard of claim 1 further including as a portion of a splash guard assembly flange fasteners positioned when in use along the mounting part in spaced relationship to each other, the flange fasteners having apertures for receivng threaded fasteners.

7. The splash guard of claim 1 in combination with a vehicle wheel well including an opening lined by a wheel well liner terminating along an interior surface of the vehicle flange.

8. The combination of claim 7 wherein flange fasteners are adapted to be maintained in locking engagement with the mounting part by means comprising a threaded fastener and a locking cap threadedly engageable with said fastener.

9. The combination of claim 8 wherein the mounting part is extended to include mounting tabs, the mounting tabs projection from an edge surface of the mounting part being curved in a plane of cross section which is upright and curved substantially as greatly as the wheel well flange of the vehicle.

10. The splash guard of claim 1 in combination with a vehicle including a wheel well opening accessing a vehicle wheel well having a wheel well liner terminating along an exterior surface of the vehicle flange.

11. The combination of claim 10 wherein the mounting part extends from the body portion, being substantially rectangular in an upright plane of cross section, and said mounting part extending from the body portion, being substantially rectangular in an upright plane of cross section, and having apertures positioned whereby the mounting part apertures are aligned with a plurality of pre-existing wheel well liner apertures and the fastening means comprises threaded fasteners extending through the mounting part apertures and apertures in the liner and secured in the vehicle flange apertures.

12. The splash guard of claim 1 wherein the flange and body portions are of different materials having substantially different elastic and deformation characteristics.

13. A splash guard for use on auto vehicle having a body panel including a flange defining a wheel well opening curved in a plane of cross section longitudinal of the vehicle and a body surface curved in a plane of cross section transverse to the vehicle, the splash guard comprising:

(a) a body portion having, in an upright plane of cross section when the splash guard is in use, a curved contour constructed substantially to correspond to the wheel well flange of any vehicle on which it is intended to be mounted;

(b) the body portion including an upper section having a generally straight outer surface and an opposed surface curved substantially to the curvature of such body panel in such transverse plane of such intended vehicle to provide a mounting part having a wheel well flange engagement surface adapted to engage and cover a section of such wheel well flange when in use;

(c) the mounting part having a curvature in an upright plane of cross section substantially equal to or greater than the curvature of a wheel well flange of substantially any vehicle of intended use whereby when in use such mounting part either remains undistorted or is distorted into a condition of lesser curvature;

(d) the body portion also including a lower splash deflecting section of a transverse dimension greater than the remainder of the body portion and greater than the transverse dimension of any original equipment tire on any such vehicle of intended use;

(e) the body portion curved contour in such upright plane of cross sectin extending through at least a substantial portion of the splash deflecting section whereby to rigidify the deflecting section against wind and other forces tending to bend the deflection section rearwardly when in use and to disguise distortion due to flexure of the splash guard when it is mounted;

(f) the splash guard also including a flange portion projecting from the body portion in a direction that is rearwardly when in use, the flange portion being curved transversely of the body portion in a contour substantially complemental to the opposed surface such that the flange portion and the opposed surface define spaced extremities of the wheel well flange engagement surface;

(g) the flange portion including a body panel engagement surface at an acute angle with the wheel well flange engagement surface in a plane of cross section longitudinal of the vehicle when the splash guard is in use, the flange portion also including a curved fillet part joining the engagement surfaces;

(h) the flange portion also having an outer surface contoured to a configuration which disguises any deformation of the flange portion which may occur when the splash guard is in use and the panel engagement surface of the flange portion is in deforming engagement with a body panel of the vehicle; and, (i) the flange portion outer and engagement surfaces generally tapering toward one another in a direction away from the body portion to provide a reducing flange wall thickness whereby the flange portion will function in the nature of an exponential spring providing a non linear increase in internal resistance to flange portion deformation over an available, panel engagement produced deformation range.

14. The splash guard of claim 13 wherein the mounting part is offset forwardly of the remainder of the body portion when the splash guard is in use.

15. The splash guard of claim 13 wherein the angle between the engagement surfaces is so acute that it will continue to be acute when the mounting part is deformed into wheel well flange engagement on substantially any vehicle of intended use.

16. The splash guard of claim 13 wherein the splash deflecting section has a curved contour in a transverse plane of cross section such that the deflection section is dished to rigidify the deflecting section and to disguise distortion when it is mounted.

17. The splash guard of claim 13 wherein the lower section has a bottom surface curved sufficiently to disguise mounting induced splash guard deformations and a lack of parallelism with a road surface when in use.

18. The splash guard of claim 13 wherein the flange and body portions are of different materials having substantially different elastic and deformation characteristics.

* * * * *